US010686879B2

(12) United States Patent
Darcy

(10) Patent No.: US 10,686,879 B2
(45) **Date of Patent: *Jun. 16, 2020**

(54) REPLICATION WITH ADJUSTABLE CONSISTENCY LEVELS

(71) Applicant: Red Hat, Inc., Raleigh, NC (US)

(72) Inventor: Jeffrey Jon Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,523

(22) Filed: Jul. 20, 2018

(65) Prior Publication Data

US 2018/0332112 A1 Nov. 15, 2018

Related U.S. Application Data

(63) Continuation of application No. 14/546,228, filed on Nov. 18, 2014, now Pat. No. 10,051,052.

(51) Int. Cl.
*H04L 29/08* (2006.01)
*G06F 16/182* (2019.01)

(52) U.S. Cl.
CPC ........ *H04L 67/1095* (2013.01); *G06F 16/184* (2019.01); *H04L 67/1097* (2013.01)

(58) Field of Classification Search
CPC ............. H04L 67/1095; H04L 67/1097; G06F 16/184; G06F 17/30212
See application file for complete search history.

(56) References Cited

U.S. PATENT DOCUMENTS

| | | | |
|---|---|---|---|
| 5,924,116 | A | 7/1999 | Aggarwal et al. |
| 5,926,101 | A | 7/1999 | Dasgupta |
| 6,003,030 | A | 12/1999 | Kenner et al. |
| 6,081,840 | A | 6/2000 | Zhao |
| 6,101,534 | A | 8/2000 | Rothschild |
| 6,275,852 | B1 | 8/2001 | Filepp et al. |
| 6,374,336 | B1 | 4/2002 | Peters et al. |
| 6,415,373 | B1 | 7/2002 | Peters et al. |
| 6,427,212 | B1 | 7/2002 | Frey |
| 6,535,869 | B1 | 3/2003 | Housel |
| 6,728,848 | B2 | 4/2004 | Tamura et al. |
| 6,763,377 | B1 | 7/2004 | Belknap et al. |

(Continued)

OTHER PUBLICATIONS

Darcy, "GlusterFS Algorithms: Replication (Future)", http://hekafs.org/index.php/2012/03/glusterfs-algorithms-replication-future/, Mar. 29, 2012.

(Continued)

*Primary Examiner* — Davoud A Zand
(74) *Attorney, Agent, or Firm* — Womble Bond Dickinson (US) LLP; Daniel E. Ovanezian

(57) ABSTRACT

Replication in a distributed file system is described. A processing device determines that a completion threshold has been satisfied in view of at least a received indication of completion of a new data modification request, wherein the completion threshold comprises a number of server devices of the distributed file system for which the new data modification has been performed thereon. The processing device provides, in response to determining that the completion threshold has been satisfied, a message to a client device that the new data modification request was performed successfully.

20 Claims, 5 Drawing Sheets

(56) References Cited

U.S. PATENT DOCUMENTS 6,789,112 B1 9/2004 Freeman et al.
6,970,939 B2 11/2005 Sim
7,228,397 B2 6/2007 Tamura et al.
7,272,613 B2 9/2007 Sim et al.
7,984,151 B1 7/2011 Raz et al.
8,234,518 B2 7/2012 Hansen
8,489,773 B1 7/2013 Binshtock et al.
8,914,406 B1 * 12/2014 Haugsnes ........... H04L 63/1441 707/769
9,294,558 B1 * 3/2016 Vincent ............... H04L 67/1006
9,602,424 B1 * 3/2017 Vincent ................... H04L 47/70
2001/0034737 A1 10/2001 Cane et al.
2002/0199073 A1 12/2002 Tamura
2004/0177098 A1 9/2004 Tamura et al.
2005/0027735 A1 2/2005 Cabrera et al.
2007/0055765 A1 * 3/2007 Lisiecki .............. H04L 67/1095 709/223
2007/0214294 A1 9/2007 Tamura et al.
2009/0307763 A1 12/2009 Rawlins et al.
2009/0313230 A1 12/2009 Shimizu
2010/0217837 A1 8/2010 Ansari et al.
2013/0066951 A1 * 3/2013 Agranat .............. H04J 14/0227 709/203
2013/0325823 A1 * 12/2013 Resch ................. H04L 63/0823 707/695
2014/0129521 A1 5/2014 Marsden
2014/0244728 A1 8/2014 Endo et al.
2015/0067819 A1 * 3/2015 Shribman ............... H04L 67/06 726/12
2016/0065670 A1 * 3/2016 Kimmel .............. H04L 67/1097 709/219

OTHER PUBLICATIONS

Duffee-Braun, "Split-Brain Management in Red Hat Storage" https://access.redhat.com/sites/default/files/attachments/rhstorage_split-brain_20131120_0.pdf, Nov. 20, 2013.

Haung et al., "The Hydra: A layered, Redundant Configuration Management Approach for Cloud-Agnostic Disaster Recovery", The Hydra: A layered, Redundant Configuration Management Approach for Cloud-Agnostic Disaster Recovery, 2001.

"Features/New-Style-Replication", Gluster Documentation, "http://www.gluster.org/community/documentation/index.php/Features/new-style-replication", Aug. 26, 2014.

"New Style Replication", Platypus Reloaded, http://blog.gluster.org/2014/04/new-style-replication/, Apr. 16, 2014.

* cited by examiner

REPLICATION WITH ADJUSTABLE CONSISTENCY LEVELS

REFERENCE TO RELATED APPLICATION

This application claims the benefit of U.S. application Ser. No. 14/546,228, filed Nov. 18, 2014, which is incorporated herein by reference.

TECHNICAL FIELD

The present disclosure relates to a distributed file system, and more particularly, to new style replication in the distributed file system.

BACKGROUND

Data may be stored as unstructured data, for example, in files and directories in a file system. A distributed file system may store multiple copies ("replicas") of a file and/or directory on more than one storage server machine to help ensure that, in case of a hardware failure and/or system failure, the data is still be accessible. When a server machine updates one of the replicas, such changes are typically propagated to the other replicas within the distributed file system.

DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
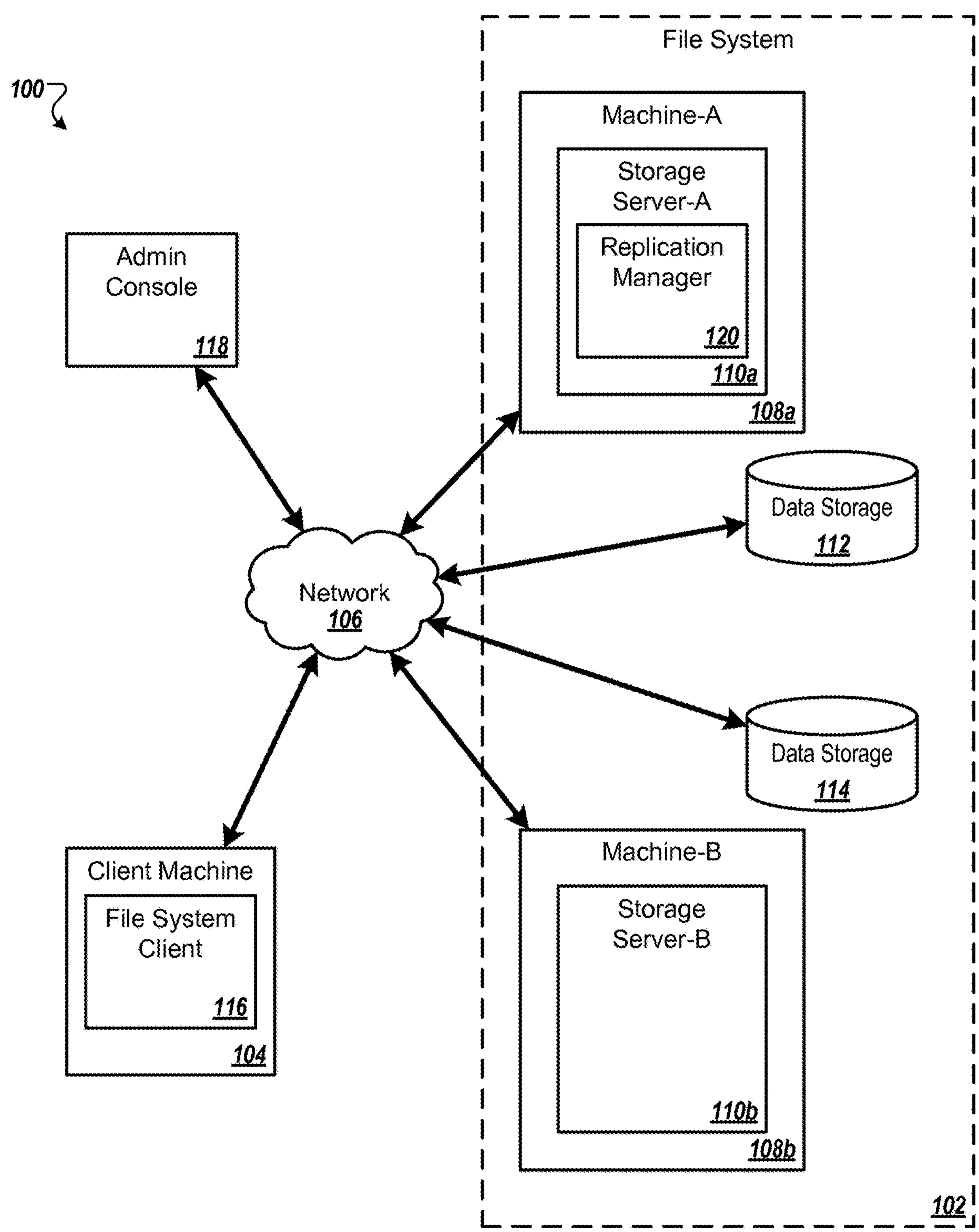
FIG. 1 is an example system architecture for various embodiments.

Described herein are techniques for new style replication in a distributed file system. The distributed file system may include several server machines that each have a replica (a copy) of a file or directory. A client device may request to modify the file or directory. Under some conventional approaches, the client device contacts each of the several server machines and requests that each of the several server machines perform the modification to their respective replica. This approach, however, can result in a "split brain." The term split-brain may refer to a scenario when two (or more) of the several server machines have determined that each is the correct owner of the replication process, which can cause confusion and instability in the distributed file system. In addition to being susceptible to split brain scenarios, conventional distributed file systems are typically designed with one purpose in mind. Specifically, distributed file systems are typically designed for one of: high data consistency, high data availability, or high performance. For example, one distributed file system may have specific hardware and software designed for high performance while another distributed file system may have different hardware and software hardware specifically designed for high data consistency. Conventional systems typically do not permit a single distributed file system to be adjustable with respect to performance, availability and consistency. This is often because different design features of distributed file systems are in tension with each other. For example, a conventional highly consistent system may not report a successful modification to a replica until after all of the several servers in the distributed file system has completed the modification. As the number of servers in the distributed file system increases, so may the time it takes for each of the servers to perform the modification and then inform the client of the success. Other conventional distributed file systems that are designed for high performance may perform a single successful modification on only one of the servers in the distributed file system before reporting the successful modification to the client device. With only one server having performed the modification, this type of system may not be highly consistent, especially if the only server with the successful modification goes down.

Aspects of the present disclosure address these and other shortcomings of conventional systems by providing a distributed file system that may be adjusted for performance, availability and/or consistency. The distributed file system includes a coordinator to manage modification of data (e.g., files or directories) in the distributed file system. The coordinator receives a data modification request from the client device. The coordinator also directs the other servers in the distributed file system to perform the data modification request on their respective replicas. In this manner, having the coordinator oversee performance of the data modification request in the distributed file system may eliminate "split brain" syndrome. Once a threshold number of servers within the distributed file system have performed the data modification request, the coordinator provides a message to the client that the data modification request was performed successfully. The threshold number may be set to a number fewer than the total number of servers in the distributed file system, which causes the coordinator to provide the message that the data modification request was performed successfully to the client before all of the servers have performed the data modification. Sending the message before all of the servers have performed the data modification may improve overall performance while temporarily reducing consistency. A user of the client device may provide to the coordinator, via the client device, any number of operational parameters in one or more requests that are related to a desired performance, availability and/or consistency for the client device's use of the distributed file system. For example, a user may select one or more operational parameters pertaining to high performance, a high availability, or a high consistency. The coordinator may use the received operational parameter to adjust the distributed file system accordingly, as further described herein.

FIG. 1 is an example system architecture 100 for various embodiments. The system architecture 100 can include a distributed file system 102 coupled to one or more client machines 104 via a network 106. The distributed file system 102 can be a network attached file storage system that includes one or more machines 108*a-b* and one or more mass storage devices, such as magnetic or optical storage based disks 112,114, solid-state drives (SSDs) or hard drives, coupled to the machines 108*a-b* directly or via the network 106. The machines 108*a-b* can include, and are not limited to, any data processing device, such as a desktop computer, a laptop computer, a mainframe computer, a personal digital assistant, a server computer, a handheld device or any other device configured to process data. The network 106 may be a public network, a private network, or a combination thereof.

The distributed file system 102 can store data as files and can include directories, which are virtual containers within the file system 102, in which groups of files and possibly other directories can be kept and organized. The machines 108*a-b* can include storage servers 110*a-b* to manage the files and directories in the data stores 112, 114 for a corresponding storage server 110*a-b*. The data stores 112, 114 can be one or more persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items. It should be understood that although FIG. 1 illustrates two storage servers 110*a* and 110*b*, the distributed file system 102 can include any number of storage servers 110 that include a replica of the file or directory.

One or more client machines 104 can include a file system client 116 to communicate with the storage servers 110*a-b* in the file system 102. File system client 116 can request access to or a modification of (e.g., write, modify, truncate, delete, move) a file or directory within the distributed file system 102. Examples of file system clients 116 can include, and are not limited to, native file system clients and network file system (NFS) clients. "Native" can describe support for specific operating systems. For example, a native file system client may be, and is not limited to, a file system client that supports the Linux operating system. The file system client 116 can mount the file system 102 via a mount point to access the data in the file system 102.

One of the storage servers 110 in the file system 102 can be elected as a coordinator for a term during which a sequence of data modification requests is to be performed. The term may be defined by a period of time, by a number of modification requests, or until another storage server 110 is elected as the coordinator, etc. The election of the coordinator can be done by appointment by a system administrator. Alternatively, a storage server may be elected as a coordinator based on one or more characteristics of the storage server, such as a performance characteristic (e.g., server with greatest processing ability among the servers in the file system 102, a server which is close in proximity to a majority of client machines 104, etc.). Once a coordinator has been elected, the identity of the coordinator can be provided to the file system client 116 such that the file system client 116 contacts the coordinator for subsequent data modification requests. The storage server 110*a* which has been elected as the coordinator can include a replication manager 120.

The replication manager 120 handles the replication of modifications to files or directories within the distributed file system 102. The replication manager 120 can receive a data modification request from the file system client 116. The replication manager 120 can then create or modify a sequence of modification requests that includes the modification request. The replication manager 120 can assign a sequence number to the data modification request and can store the modification request and the sequence number in a log file or any other data structure. The sequence number can indicate to a storage server when to perform the data modification request in relation to other data modification requests within the sequence. Upon receiving the data modification request, the replication manager 120 can identify other storage servers 110 within the distributed file system 102, such as by accessing metadata that includes information related to all of the replicas of a file within the distributed file system 102. Such metadata can be stored on data storage 112, 114 and may include information related to storage servers 110 that are associated with the replicas of the file or directory to be modified. The replication manager 120 may periodically update the metadata as storage servers 110 may join or exit the distributed files system 102. The replication manager 120 can provide the data modification request to the storage servers 110 within the file system 102. After performing the data modification request, the storage servers 110 can provide, to the replication manager 120, an indication that the data modification request has been performed on the respective storage server 110. When the replication manager 120 receives a threshold number of indications that the data modification request has been performed, the replication manager 120 can report to the client machine 104 that the modification request has been performed successfully. Some embodiments of the replication manager 120 are described in greater detail below in conjunction with FIG. 2.

In some embodiments, the storage server A 110*a* uses a log file to track data modification requests. A log file can refer to a data structure (e.g., a file, a table, a web page, etc.) specifying modifications to one or more files or directories. Each term (as described above) can have a separate log file. The log file can include a sequence of data modification requests that were performed during the term. As the coordinator receives new data modification requests, the new data modification requests can be added to the log file. In some embodiments, a new data modification request is added to the end of the log file such that the data modification requests are organized chronologically from top to bottom. In some embodiments, the data modification requests in a log file are also associated with a sequence number, as described herein. The log file can be a centralized log file, such as in a shared space or shared memory, that all servers in the distributed file system can access. The coordinator can provide the log file to each server in the distributed file system. In some examples, the coordinator can determine that all of the servers within the distributed file system have performed each of the data modification requests within the log file for a particular term. In some examples, the coordinator can delete or archive the log file when all of the servers within the distributed file system have performed each of the data modification requests within the log file.

Figure 2:
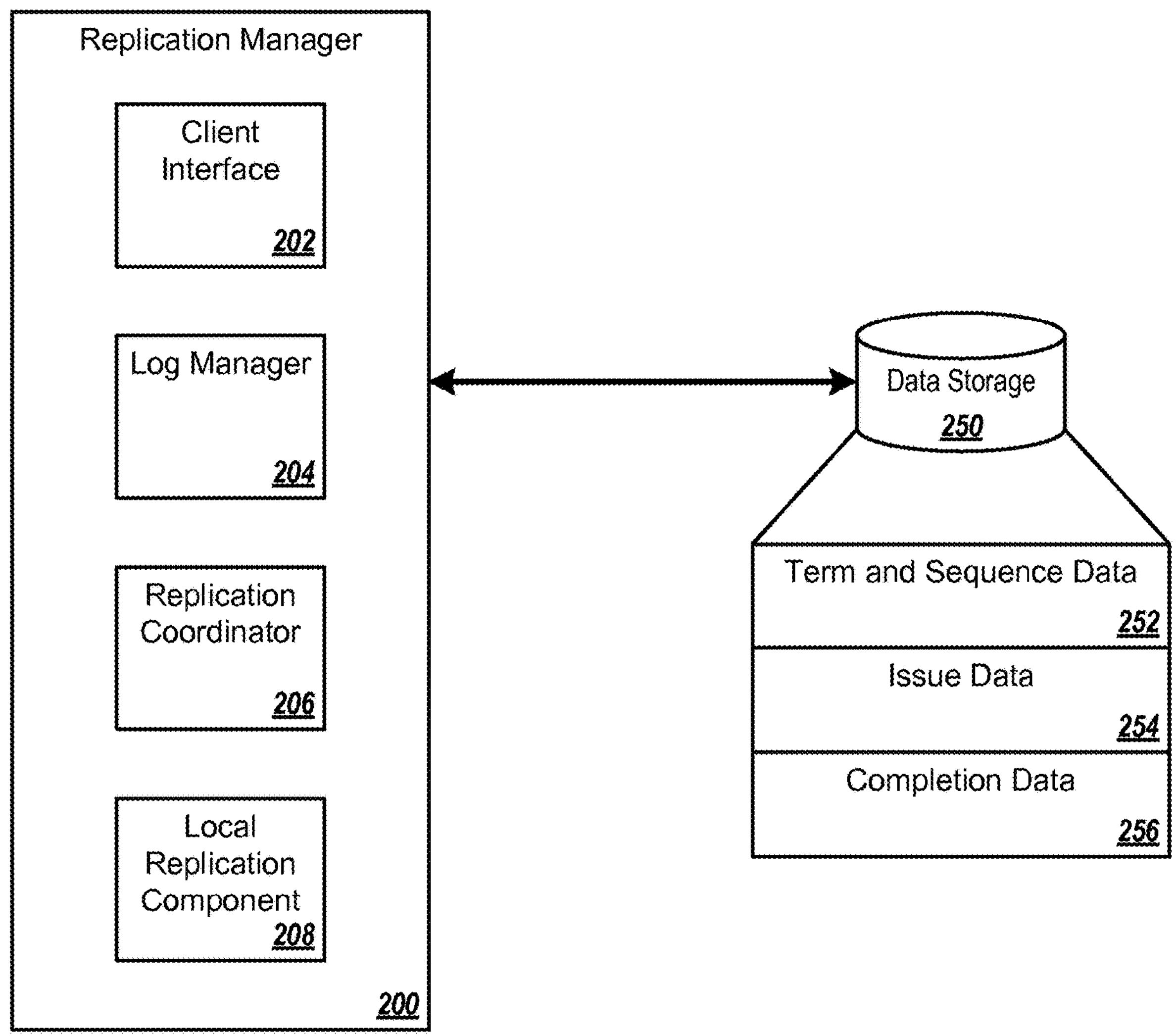
FIG. 2 illustrates a block diagram of one embodiment of a replication manager in accordance with some embodiments.

FIG. 2 illustrates a block diagram of one embodiment of a replication manager 200. In one embodiment, replication manager 200 corresponds to replication manager 120 of FIG. 1. Replication manager 200 may include a client interface 202, log manager 204, replication coordinator 206, and local replication component 208. Alternatively, the functionality of one or more of the ten client interface 202, log manager 204, replication coordinator 206, and local replication component 208 may be combined into a single module or subdivided into multiple modules. The replication manager 200 is part of a server (e.g., server 110*a* of FIG. 1) which has been elected as a coordinator of a distributed file system for a term.

The client interface 202 is in data communication with a client device (such as client machine 104 of FIG. 1). For example, the client interface 202 and the client device may be connected via a network (such as network 106 of FIG. 1). The client interface 202 receives communications from and provides communications to the client device. The client interface 202 can receive a new data modification request from a client device. The new data modification request can be modification (e.g., create, modify, delete, move) to a file or to a directory. The client interface 202 may inform the log manager 204 that the replication manager 200 has received a new data modification request. The client interface 202 may also receive various operational parameters from the client, such as desired consistency, performance and availability parameters. For example, the client interface 202 may receive a preference of the client to favor one of a high performance, a high availability, or a high consistency, as further described herein.

The log manager 204 creates and updates a log of data modifications for the term. The log can be a file of any type, such as XML. The log can include a sequence of data modification requests that were received and/or processed during the term. The log manager 204 can organize the data modification requests in the log in any order. In some embodiments, the data modification requests in the log are organized chronologically. When the client interface 202 receives a data modification request, the log manager 204 can assign a sequence number to the data modification request, where the sequence number is to indicate when to perform the data modification request with respect to other data modification requests in the log. In some embodiments, the log manager 204 adds new data modification requests to the log in the order in which they were received. Thus, a sequence number may not be assigned in this embodiment and the sequence of the data modification requests is implicit according to their order within the log.

The replication coordinator 206 manages replication of data modification requests among servers within the distributed file system. The replication coordinator 206 may provide the log to other servers along with an instruction to perform any of the data modification requests in the order indicated within the log. When the replication coordinator 206 provides the log to another server, the replication coordinator 206 may update an issue count. The issue count is to indicate a number of servers that have been provided with the new data modification request. The issue count can be any whole number from zero to N−1, wherein N is the number of replicas (e.g., excluding the replica on the coordinator) or servers with the replicas within the distributed file system (e.g., excluding the coordinator). In some embodiments, once the issue count matches an issue threshold, the replication coordinator 206 may inform the local replication component 208 that the issue threshold has been met. The issue threshold may represent a number of non-coordinator servers to which a modification is issued before the coordinator performs the data modification request locally.

As the other servers complete the data modification request, the other servers may send an indication of completion of the new data modification request. As the replication coordinator 206 receives these indications of completion, the replication coordinator 206 can updated a completion count that represents a number of servers that have completed the new data modification request. The completion count can be any number between zero and M, where M is the number of servers within the distributed file system that have a replica of the file, including the coordinator. Once the completion count matches a completion threshold, the replication coordinator 206 can provide a message to the client device that the new data modification request was performed successfully.

The local replication component 208 may perform the new data modification request locally on the first server when the issue threshold is met. In some embodiments, the local replication component 208 monitors the issue count in the issue data 254 to determine whether the issue count matches the issue threshold. In some embodiments, the local replication component 208 is informed that the issue threshold has been met by the replication coordinator 206, as discussed above. Once the local replication component 208 performs the new data modification request, the replication coordinator 206 updates the completion count.

In some embodiments, the completion count and/or the issue count is set by a system administrator. In some embodiments, the completion count and/or the issue count are set by the client device. For example, a client may indicate an issue count of "0" such that the local replication component 208 may begin processing the new data modification request immediately. The client may also indicate a completion count of "1" such that the replication coordinator 206 provides a message to the client device that the new data modification request was performed successfully on at least one server within the distributed file system.

In some embodiments, the client device provides an operational parameter of performance, availability, and/or a consistency to the replication manager 200. The replication coordinator 206 may then determine appropriate issue and/or threshold counts based on the operational parameter received from the client. For example, when the client device provides a consistency parameter that indicates a desire for high consistency, the client interface may set the completion count and/or the issue count that match the operational parameter. In some embodiments, a highly consistent system has a higher completion threshold than a system with a lower consistency. In some embodiments, a system with higher performance may have a lower issue threshold and a lower completion threshold.

In some embodiments, the replication manager forwards the data modification request to all other servers (i.e., the issue threshold is equal to the number of servers in the distributed file system, excluding for the coordinator), before performing the data modification request locally and also does not report success to the client device until all data modification requests have been performed (i.e., the completion threshold is equal to the number of servers in the distributed file system, including the coordinator). In some embodiments, the issue threshold and/or the completion threshold may be relaxed to achieve improved performance and/or asynchronous replication with a possible reduction in consistency until all servers have performed the data modification request.

In some embodiments, the issue threshold is N−1 and the completion threshold is N to maximize consistency. In other embodiments, the issue threshold is 0, which permits the coordinator to locally perform the data modification request immediately upon receiving the data modification request from the client, which may improve performance. In other embodiments, the completion threshold is 1, which permits the client interface 202 to report success as soon as one of the servers in the distributed file system has reported completion of the data modification request. In this embodiment, other servers perform the data modification request asynchronously. By permitting dynamic issue and completion thresholds, the distributed file system includes both synchronous and asynchronous replication within the same framework.

In some embodiments, a high issue or completion count may be indicative of synchronous (or at least semi-synchronous) operation. Such synchronous or semi-synchronous operation may provide a consistency guaranty that is commonly required within a local environment, but may be less than what is otherwise acceptable in a high-latency WAN environment.

In some embodiments, an issue count of zero and a completion count of one allows the same framework to also be used for asynchronous replication. This may provide acceptable performance in high-latency environments, at a possible decrease in consistency.

In some embodiments, when the completion count is also zero, the same framework can also be used to implement a temporary storage (e.g., a cache or scratch space) in a system where consistency or durability may not be required.

Figure 3:
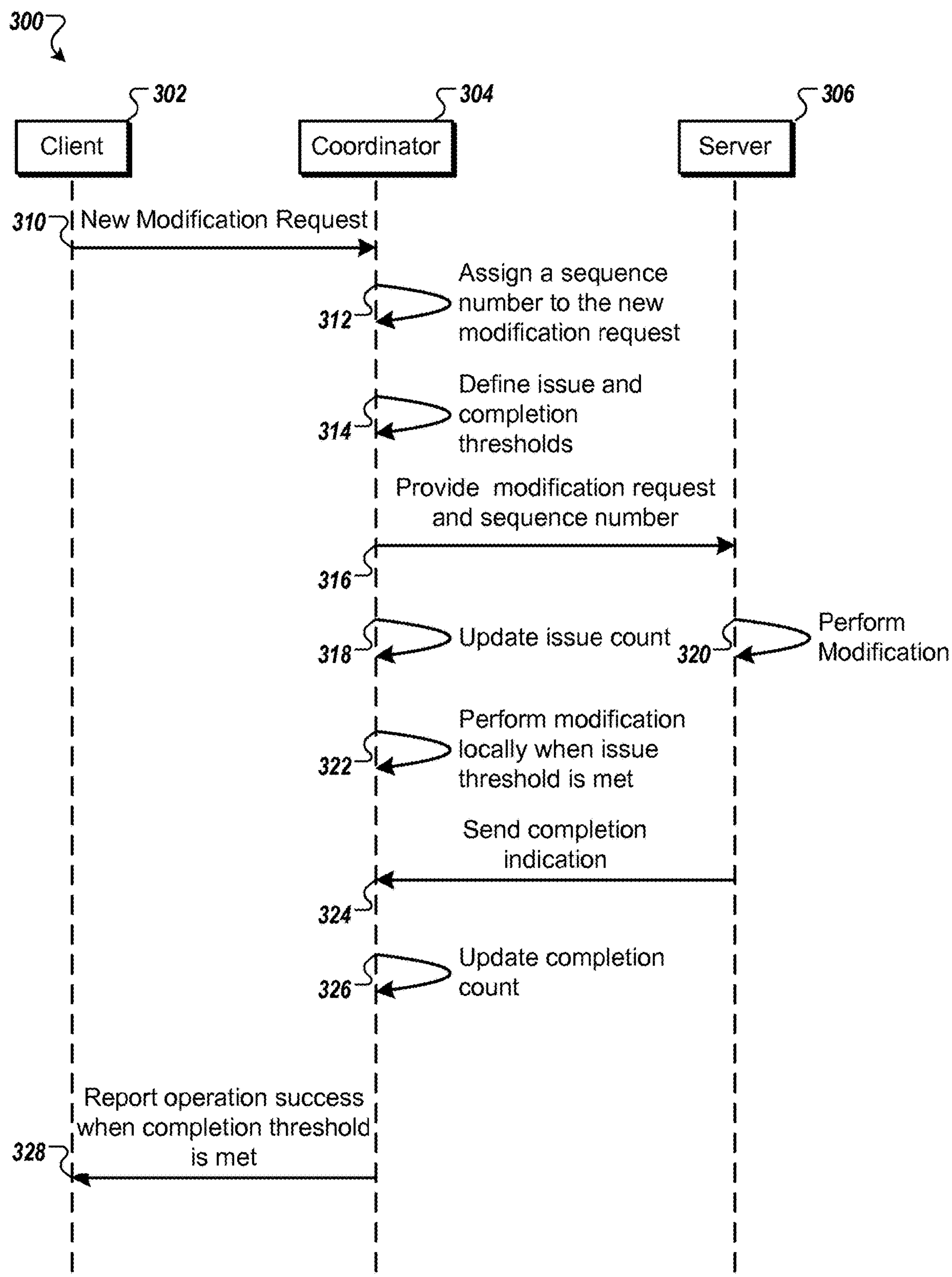
FIG. 3 illustrates a sequence diagram for file replication in a distributed file system according to embodiments.

FIG. 3 illustrates a sequence diagram 300 for file replication in a distributed file system according to embodiments. The distributed file system can include any number of servers (e.g., coordinator 304, server 306) and can be accessed by any number of clients, one of which can be client 302. In some embodiments, client 302 can be client machine 104 of FIG. 1, coordinator can be storage server A 110*a* of FIG. 1 and server 306 can be storage server B 110*b* of FIG. 1.

In FIG. 3, at 310, the client 302 sends a data modification request to the coordinator 304. Once the coordinator 304 receives the data modification request from the client, the coordinator 304 assigns a sequence number to the data modification request at 312. At 314, the coordinator 304 defines an issue threshold and the completion threshold as described herein.

At 316, the coordinator provides the data modification request and the sequence number to the server 306. At 318, the coordinator 304 updates an issue count to reflect the modification request has been provided to the server 306. At 320, the server 306 performs the modification request. At 324, the server 306 sends a completion indication to the coordinator 304 after the server 306 is performed modification.

At 322, the coordinator 304 performs the modification locally when the issue threshold is met, as described herein. At 326, the coordinator 304 updates the completion count in view of either the completion indication received from the server 306 or upon completion of the modification that was performed locally at 322. When a completion threshold is met, the coordinator 304 reports to the client 302 that the modification request has been performed successfully at 328.

Figure 4:
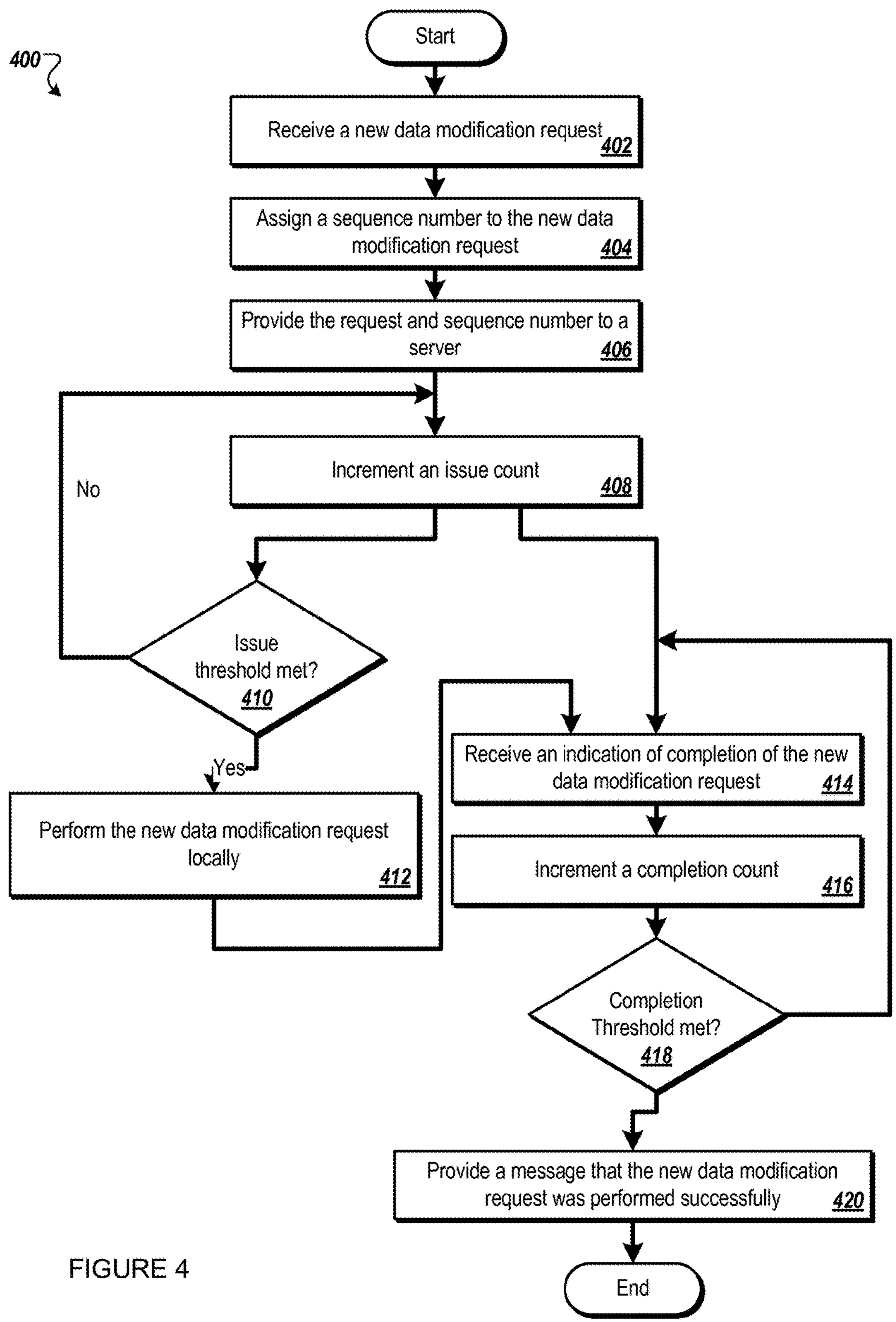
FIG. 4 is a flow diagram of a method for modifying replicas of file in a distributed file system in accordance with some embodiments.

FIG. 4 is a flow diagram of a method 400 for modifying replicas of file in a distributed file system in accordance with some embodiments. Method 400 can be performed by processing logic (e.g., in computing system 500 of FIG. 5) that may comprise hardware (e.g., circuitry, dedicated logic, programmable logic, microcode, etc.), software (such as instructions run on a processing device), firmware, or a combination thereof. In some embodiments, method 400 is performed primarily by a storage server 110 of FIG. 1. For clarity of presentation, the description that follows uses the system 100 as examples for describing the method 400. However, another system, or combination of systems, may be used to perform the method 400.

Referring to FIG. 4, in one embodiment, method 400 begins at block 402 when the processing logic receives a new data modification request from a client device (e.g., from the client machine 104 of FIG. 1). The new data modification request may be any type of modification to a file or directory, as described herein.

At block 404, the processing logic assigns a sequence number to the new data modification request. At block 406, the processing logic provides the request and the sequence number to a server. The server is to perform the new data modification request in view of the sequence number.

At block 408, the processing logic increments an issue count, as described herein. At block 410, the processing logic determines whether an issue threshold has been met. When the issue threshold has been met, the processing logic returns to block 406 where the processing logic provides the request and sequence number to another server. Then, at block 408, the processing logic increments the issue count again to reflect that the request and sequence number have been provided to the other server. When the issue threshold has been met, the processing logic performs the new data modification locally at block 412.

At block 414, the processing logic processing logic receives an indication of completion of the new data modification request from the server. At block 416, the processing logic increments a completion count to reflect that the data modification has been completed on the server. At block 418, the processing logic determines that a completion threshold has been satisfied in view of the received indication of completion of the new data modification request. When the completion threshold is met, at block 420 the processing logic provides a message to the client device that the new data modification request was performed successfully.

Figure 5:
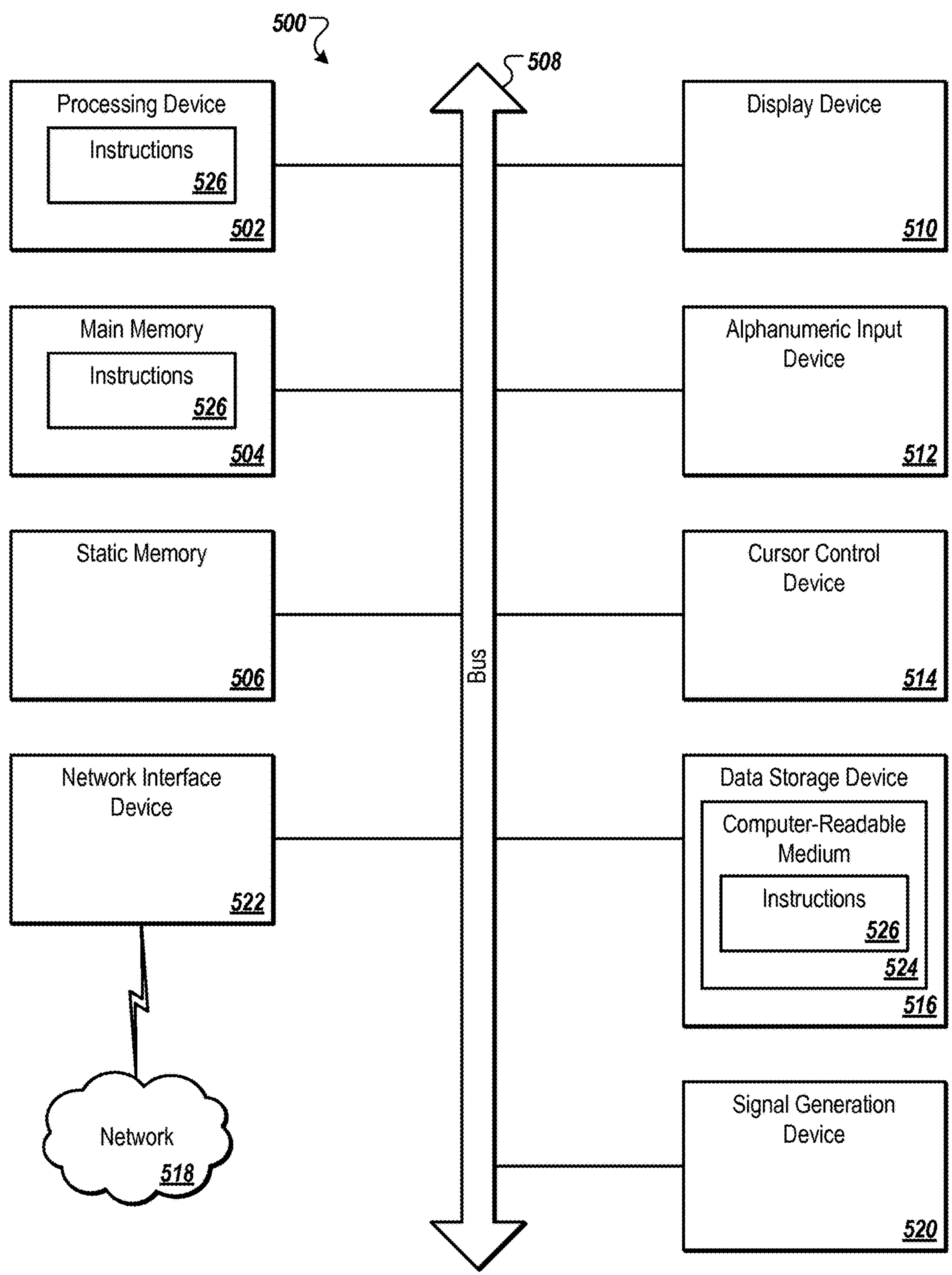
FIG. 5 illustrates an example machine of a computer system within which a set of instructions, for causing the machine to perform any one or more of the methodologies discussed herein, may be executed.

FIG. 5 illustrates an example machine of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computing system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 508.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and methods discussed herein.

The computer system 500 may further include a network interface device 522 (e.g., network adapter). The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one embodiment, the instructions 526 include instructions for a state manager and a self-healing manager and/or a software library containing methods that call modules in a state manager and a self-healing manager. While the machine-readable storage medium 524 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "locating" or "determining" or "self-healing" or "examining" or "comparing" or "acquiring" or "providing" or "receiving" or "updating" or "setting" or "removing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiment of the disclosure have been described with reference to specific example embodiment thereof. It will be evident that various modifications may be made thereto without departing from the broader spirit and scope of embodiment of the disclosure as set forth in the following claims. The specification and drawings are, accordingly, to be regarded in an illustrative sense rather than a restrictive sense.

What is claimed is:

1. A method comprising:

determining, by a processing device of a server device, that a completion threshold has been satisfied in view of a received indication of completion of a new data modification request, wherein the completion threshold comprises a number of the server devices of the distributed file system for which a new data modification has been performed thereon; and providing, in view of the determining, a message to a client device that the new data modification request was performed successfully.

2. The method of claim 1, further comprising:

receiving, by the processing device of a first server device, the new data modification request from the client device;

assigning, by the processing device, a sequence number to the new data modification request;

providing the request and the sequence number to a second server device, the second server device to perform the new data modification request in the view of the sequence number;

receiving an indication of completion of the new data modification request from the second server device, wherein the first server device is elected as a coordinator within a distributed file system for a term during which a sequence of data modification requests is to be performed, the sequence of data modification requests comprising the new data modification request.

3. The method of claim 2, wherein the data modification requests are organized chronologically within the sequence, wherein assigning the sequence number to the new data modification request comprises adding the assigned sequence number to an end of the sequence.

4. The method of claim 1 further comprising:

receiving an operational parameter from the client device; and determining the completion threshold in view of the received operational parameter.

5. The method of claim 4 further comprising receiving the completion threshold from the client device.

6. The method of claim 4, wherein determining that the completion threshold has been satisfied comprises:

incrementing a completion count upon receiving the indication of completion; and determining that the completion count matches the completion threshold.

7. The method of claim 4, wherein the operational parameter is user selectable, the method further comprising receiving a user selected operation parameter from the client device.

8. The method of claim 1 further comprising:

receiving an operational parameter from the client device; and determining an issue threshold in view of the operational parameter.

9. The method of claim 7 further comprising receiving the issue threshold from the client device.

10. The method of claim 2, further comprising performing the new data modification request locally on the first server device when an issue threshold is met.

11. The method of claim 9, wherein performing the new data modification request locally comprises:

incrementing an issue count upon providing the request and the sequence number to the second server device; and determining that the issue count matches the issue threshold.

12. The method of claim 2, wherein the server device is the first server device.

13. A system, comprising:

a memory;

a processing device operatively coupled to the memory, the processing device to:

receive a new data modification request from a client device;

assign a sequence number to the new data modification request;

provide the request and the sequence number to a server device, the server device to perform the new data modification request in view of the sequence number;

increment an issue count upon providing the request and the sequence number to the server device;

determine that the issue count matches an issue threshold; and perform the new data modification request locally when the issue threshold is met.

14. The system of claim 11, wherein the processing device is further to:

receive an indication of completion of the new data modification request from the server device;

determine that a completion threshold has been satisfied in view of the received indication of completion of the new data modification request; and provide, in view of the determining, a message to the client device that the new data modification request was performed successfully.

15. The system of claim 13, wherein the processing device is further to:

receive an operational parameter from the client device; and determine the completion threshold in view of the received operational parameter.

16. The system of claim 14, wherein when determining that the completion threshold has been satisfied, the processing device is to:

increment a completion count upon receiving the indication of completion; and determine that the completion count matches the completion threshold.

17. The system of claim 11, wherein the processing device is further to:

receive an operational parameter from the client device; and determine the issue threshold in view of the operational parameter.

18. A non-transitory computer readable storage medium including instructions that, when executed by a processing device of a server device of a distributed storage system, cause the processing device to perform operations comprising:

determining, by the processing device of the server device, that a completion threshold has been satisfied in view of at least a received indication of completion of a new data modification request, wherein the completion threshold comprises a number of server devices of the distributed file system for which the new data modification has been performed thereon; and providing, in response to determining that the completion threshold has been satisfied, a message to a client device that the new data modification request was performed successfully.

19. The non-transitory computer readable storage medium of claim 18, the operations further comprising:

receiving an operational parameter from the client device; and determining the completion threshold in view of the received operational parameter.

20. The non-transitory computer readable storage medium of claim 18, wherein determining that the completion threshold has been satisfied comprises:

incrementing a completion count upon receiving the indication of completion; and determining that the completion count matches the completion threshold.

* * * * *